(12) United States Patent
Nakamura et al.

(10) Patent No.: US 10,108,056 B2
(45) Date of Patent: *Oct. 23, 2018

(54) LIQUID CRYSTAL DISPLAY DEVICE

(71) Applicant: Japan Display Inc., Tokyo (JP)

(72) Inventors: Hidetatsu Nakamura, Tokyo (JP); Osamu Itou, Tokyo (JP); Takeshi Sakai, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/651,220

(22) Filed: Jul. 17, 2017

(65) Prior Publication Data

US 2017/0315413 A1 Nov. 2, 2017

Related U.S. Application Data

(63) Continuation of application No. 14/723,577, filed on May 28, 2015.

(30) Foreign Application Priority Data

May 30, 2014 (JP) ................................. 2014-112734

(51) Int. Cl.
*G02F 1/1343* (2006.01)
*G02F 1/1333* (2006.01)
*G02F 1/1362* (2006.01)

(52) U.S. Cl.
CPC .. *G02F 1/134363* (2013.01); *G02F 1/136286* (2013.01); *G02F 2001/134372* (2013.01)

(58) Field of Classification Search
CPC ......... G02F 1/134363; G02F 1/136286; G02F 2001/134372
See application file for complete search history.

(56) References Cited

U.S. PATENT DOCUMENTS 7,379,146 B2 * 5/2008 Lin ................... G02F 1/134363
349/141
2002/0003588 A1 1/2002 Okada et al.
(Continued)

FOREIGN PATENT DOCUMENTS

JP 2001-281682 A 10/2001
JP 2004-77718 A 3/2004
(Continued)

OTHER PUBLICATIONS

Japanese Office Action dated Jan. 23, 2018 for corresponding Japanese Application No. 2014-112734.

*Primary Examiner* — Nathanael R Briggs
(74) *Attorney, Agent, or Firm* — Typha IP LLC

(57) ABSTRACT

A pixel electrode is configured of one comb tooth portion and a contact portion whose width is widened from the end portion of the comb tooth portion in a first direction that is the extending direction of a scanning line. The width of the contact portion is not expanded in a direction opposite to the first direction, and the production of a domain is prevented. A picture signal line is bent in the direction in which the width of the contact portion of the pixel electrode is widened, so that the comb tooth portion of the pixel electrode can be disposed in the center between the picture signal lines, and the width of the contact portion can be formed in a sufficient width in the direction in which the picture signal line is bent. Thus, the contact margin of the pixel electrode can be provided.

6 Claims, 13 Drawing Sheets

(56) References Cited

U.S. PATENT DOCUMENTS

2013/0127698 A1  5/2013  Chang et al.
2015/0137130 A1  5/2015  Wang et al.

FOREIGN PATENT DOCUMENTS

| JP | 2004-325953 A | 11/2004 |
| JP | 2010-128113 A | 6/2010 |
| JP | 2010-145871 A | 7/2010 |
| JP | 2010-175790 A | 8/2010 |

* cited by examiner

LIQUID CRYSTAL DISPLAY DEVICE

CROSS-REFERENCE TO RELATED APPLICATIONS

This application is a continuation of U.S. patent application Ser. No. 14/723,577 filed on May 28, 2015. Further, this application claims priority from Japanese Patent Application JP 2014-112734 filed on May 30, 2014, the contents of which are hereby incorporated by reference into this application.

BACKGROUND

The present invention relates to a display device, and more specifically to a liquid crystal display device of a lateral electric field drive mode including a high definition screen.

A liquid crystal display device includes a TFT substrate on which pixels having a pixel electrode, a thin film transistor (TFT), and the like are formed in a matrix configuration, a counter substrate disposed opposite to the TFT substrate, and liquid crystals sandwiched between the TFT substrate and the counter substrate. The optical transmittance of liquid crystal molecules is controlled for the individual pixels, and images are formed. Since the liquid crystal display device is flat and light in weight, the use of the liquid crystal display device is increasing in various fields. A small-sized liquid crystal display device is widely used in a mobile telephone, a DSC (Digital Still Camera), and the like.

In the liquid crystal display device, viewing angle characteristics are a problem. The viewing angle characteristics are phenomena that the luminance is changed or the chromaticity is changed between the case where the screen is viewed from the front and the case where the screen is viewed from the oblique direction. As for the viewing angle characteristics, an IPS (In Plane Switching) mode has more excellent characteristics in which liquid crystal molecules are operated with a horizontal electric field. In the IPS mode, when a region having a different rotation of liquid crystal molecules, a so-called domain, is produced in a pixel, the transmittance and the like are adversely affected. Japanese Unexamined Patent Application Publication No. 2010-128113 describes the shape of a pixel electrode that can suppress the occurrence of such a domain.

On the other hand, for a medium- or small-sized liquid crystal display device, it is strongly demanded to provide a high definition screen. In this case, since a pixel becomes small, the influence of the capacitance between a picture signal line and the pixel is easily increased. Japanese Unexamined Patent Application Publication No. 2001-281682 describes a configuration for measures against display unevenness caused by the difference in capacitances between a pixel electrode and picture signal lines on the left side and the right side of the pixel.

SUMMARY

There are various IPS modes. For example, such a mode is presently a mainstream mode because the transmittance can be relatively made greater, in which a common electrode is solidly formed on a flat surface, a pixel electrode in a comb tooth shape is disposed on the common electrode as an insulating film is sandwiched between the electrodes, and an electric field generated between the pixel electrode and the common electrode rotates liquid crystal molecules. On the other hand, since the area of a pixel also becomes smaller as the definition of a screen becomes higher, a pixel electrode can be provided with only one comb tooth electrode that forms the pixel electrode. It is noted that one comb tooth electrode means one band-shaped electrode. In the present specification, the term "comb tooth electrode" is used even though there is one band-shaped electrode.

FIG. 9 is a plan view of a pixel in this case. A layer structure and the like will be described later in detail. In FIG. 9, a pixel electrode 112 exists on a region surrounded by a scanning line 10 and a picture signal line 20. The pixel electrode 112 is formed of one comb tooth. The width of the pixel electrode is wide on the side on which a TFT is formed because a through hole 130 to provide a contact with the TFT is formed. In the present specification, this portion is referred to as a contact portion 1121.

In FIG. 9, an alignment direction AL of an alignment film is depicted by a two directional arrow. Although the long axis of the comb tooth of the pixel electrode 112 is matched with the extending direction of the picture signal line 20, the alignment direction AL is tilted to the long axis of the comb tooth at a small angle. This angle is in a range of angles of five to twenty degrees. In the case of this configuration, as illustrated in FIG. 10, a domain DM is produced on the region. In FIG. 10, the pixel electrode 112 has a wide width cw1 of the contact portion 1121 through a shoulder 1122. In FIG. 10, the domain DM is produced near the left side of the shoulder 1122 because of the relationship with the alignment direction AL.

In the domain DM, since liquid crystal molecules are rotated in the direction different from the direction in the other regions, light leakage or scattering occurs in black display in the domain, whereas the domain is a region through which light is not transmitted in white display. Therefore, the domain adversely affects the luminance or the contrast of the screen.

FIG. 11 is exemplary measures against the domain. The left side of the contact portion of the pixel electrode is removed in FIG. 11. When the left part is removed, the shoulder of the pixel electrode, which produces a domain, does not exist on the left side of the pixel electrode, and no domain is produced as illustrated in FIG. 12. However, since the width cw1 of the contact portion 1121 of the pixel electrode 112 is decreased in the configuration in FIG. 12, the margin of the connection between the pixel electrode 112 and a contact electrode 107 is decreased on the second through hole 130.

Therefore, it can be considered that the pixel electrode 112 is formed in a shape as illustrated in FIG. 13. FIG. 13 is a diagram that a width cw2 of the shoulder 1122 on the right side of the pixel electrode 112 is widened to increase the width of the width cw1 of the contact portion 1121. Because of the increase, the margin of the connection between the pixel electrode 112 and the contact electrode 107 on the second through hole 130 can be provided wide as in a conventional manner.

However, when the pixel electrode 112 illustrated in FIG. 13 is applied to an actual pixel, the pixel electrode 112 is as illustrated in FIG. 14. In FIG. 14, since the width cw2 of the shoulder 1122 on the right side of the pixel electrode 112 is increased, the comb tooth portion of the pixel electrode 112 is located close to the left side. In the case of white display, the end portion of the pixel electrode 112 is the brightest in the pixel. When the pixel electrode 112 is located close to the left side as illustrated in FIG. 14, light leakage to the pixel on the left side becomes a problem. This causes a phenomenon of color mixture in the case where the screen is viewed from the oblique direction.

It is an object of the present invention is to implement a pixel configuration in a liquid crystal display device of an IPS mode that the production of a domain is suppressed in the case where one comb tooth is provided on the pixel electrode 112, the margin of the connection between the pixel electrode 112 and the contact electrode 107 can be provided on the second through hole, and color mixture does not easily occur.

The present invention is to overcome the problems, and main specific schemes are as follows.

(1) A liquid crystal display device, in which: a scanning line is extended in a first direction and arranged in a second direction; a picture signal line is arranged as the picture signal line crosses the scanning line; a pixel is formed on a region surrounded by a center line of a first scanning line, a center line of a second scanning line, a center line of a first picture signal line, and a center line of a second picture signal line; a pixel electrode is formed on a planner common electrode through an interlayer insulating film in the pixel; the pixel electrode includes a comb tooth portion and a contact portion, and a center of the contact portion in the first direction is located close to the first direction with respect to a center of the comb tooth portion in the first direction; and the center line of the first picture signal line and the center line of the second picture signal line have a first bent point bent in the first direction and a second bent point again bent in the second direction between the first scanning line and the second scanning line.

(2) In the liquid crystal display device in (1), when a distance between the center line of the first scanning line and the center line of the second scanning line in the second direction is defined as h1 and a distance between the center line of the second scanning line and the first bent point in the second direction is defined as h2, a relation ⅕≤h2/h1≤⅓ is provided.

(3) In the liquid crystal display device in (1), when a distance between the center line of the first scanning line and the center line of the second scanning line in the second direction is defined as h1 and a distance between the first bent point and the second bent point in the second direction is defined as h3, a relation 1/10≤h3/h1≤⅕ is provided.

(4) In the liquid crystal display device in (1), an angle formed of the first picture signal line and the second picture signal line in the second direction at the first bent point ranges from angles of 30 to 90 degrees.

(5) In the liquid crystal display device in (1), the first picture signal line and the second picture signal line have a third bent point bent in a direction opposite to the first direction and a fourth bent point again bent in the second direction between the second scanning line and third scanning line.

(6) A liquid crystal display device, in which: a scanning line is extended in a first direction and arranged in a second direction; a picture signal line is arranged as the picture signal line crosses the scanning line; a first pixel is formed on a region surrounded by a center line of a first scanning line, a center line of a second scanning line, a center line of a first picture signal line, and a center line of a second picture signal line; a first pixel electrode is formed on a planner common electrode through an interlayer insulating film in the first pixel; the first pixel electrode includes a comb tooth portion and a contact portion, the comb tooth portion is tilted in a direction opposite to the first direction with respect to the second direction, and a center of the contact portion in the first direction is located close to the first direction with respect to a center of the comb tooth portion in the first direction; the center line of the first picture signal line and the center line of the second picture signal line have a first bent point bent in the first direction and a second bent point again bent in the second direction between the first scanning line and the second scanning line; a second pixel is formed on a region surrounded by the center line of the second scanning line, a center line of a third scanning line, the center line of the first picture signal line, and the center line of the second picture signal line; a second pixel electrode is formed on the planner common electrode through an interlayer insulating film in the second pixel; the second pixel electrode includes a comb tooth portion and a contact portion, the comb tooth portion of the second pixel electrode is tilted to the first direction with respect to the second direction, and a center of the contact portion of the second pixel electrode in the first direction is located close to a direction opposite to the first direction with respect to a center of the comb tooth portion in the first direction; and the center line of the first picture signal line and the center line of the second picture signal line have a third bent point bent in a direction opposite to the first direction and a fourth bent point again bent in the second direction between the second scanning line and the third scanning line.

DETAILED DESCRIPTION

Figure 1:
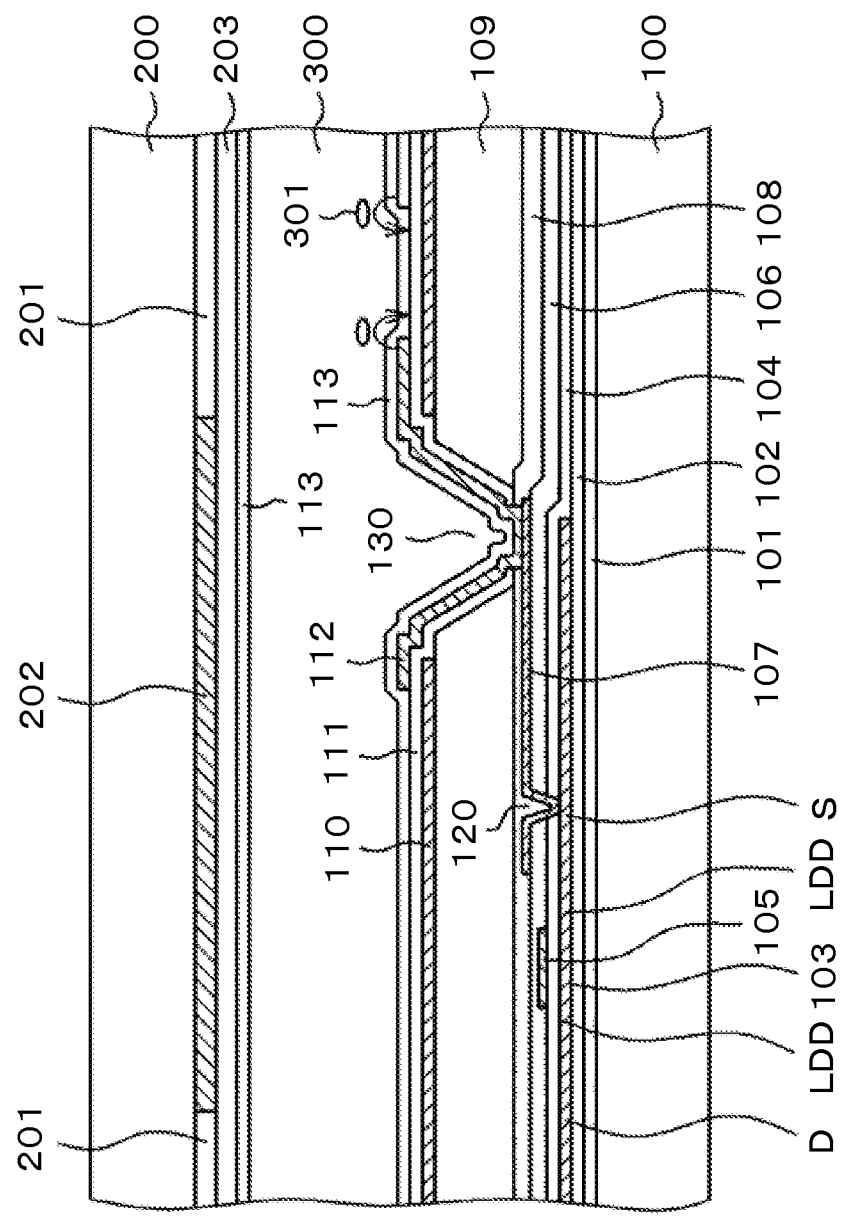
FIG. 1 is a cross sectional view of a liquid crystal display device to which an embodiment of the present invention is applied.

Prior to the description of a specific pixel structure, the structure of a liquid crystal display device to which an embodiment of the present invention is applied will be described. FIG. 1 is a cross sectional view of a liquid crystal display device to which an embodiment of the present invention is applied. A TFT in FIG. 1 is a so-called top gate TFT, and LIPS (Low Temperature Poli-Si) is used as a semiconductor for use. On the other hand, in the case where an a-Si semiconductor is used, a so-called bottom gate TFT is often used. In the following description, the description will be made as the case of using a top gate mode TFT is taken as an example, and the present invention is also applicable to the case of using a bottom gate TFT.

In FIG. 1, a first base film 101 formed of SiN and a second base film 102 formed of $SiO_2$ are formed on a glass TFT substrate 100 by CVD (Chemical Vapor Deposition). The functions of the first base film 101 and the second base film 102 are to prevent a semiconductor layer 103 from being contaminated with impurities derived from the glass TFT substrate 100.

The semiconductor layer 103 is formed on the second base film 102. This semiconductor layer 103 is a film that an a-Si film is formed on the second base film 102 by CVD, and the film is annealed with a laser and transformed into a poly-Si film. This poly-Si film is patterned by photolithography.

A gate insulating film 104 is formed on the semiconductor layer 103. This gate insulating film 104 is a $SiO_2$ film formed of TEOS (tetraethoxysilane). This film is also formed by CVD. A gate electrode 105 is formed on gate insulating film 104. A scanning line 10 illustrated in FIG. 2 also functions as the gate electrode 105. The gate electrode 105 is formed of an MoW film, for example. When it is necessary to decrease the resistance of the gate electrode 105 or the scanning line 10, an Al alloy is used.

The gate electrode 105 is patterned by photolithography. In this patterning, an impurity such as phosphorus or boron is doped into the poly-Si layer by ion implantation, and a source S or drain D is formed on the poly-Si layer. Moreover, a photoresist in patterning the gate electrode 105 is used, and a LDD (Lightly Doped Drain) layer is formed between the channel layer and the source S or drain D of the poly-Si layer.

After that, a first interlayer insulating film 106 is formed of $SiO_2$ as the gate electrode 105 is covered. The first interlayer insulating film 106 is provided to insulate the gate electrode 105 from a contact electrode 107. On the first interlayer insulating film 106 and the gate insulating film 104, a through hole 120 is formed to connect the source S of the semiconductor layer 103 to the contact electrode 107. Photolithography for forming the first interlayer insulating film 106 and photolithography for forming the through hole 120 on the gate insulating film 104 are performed at the same time.

The contact electrode 107 is formed on the first interlayer insulating film 106. The contact electrode 107 is connected to a pixel electrode 112 through a through hole 130. The drain D of the TFT is connected to a picture signal line 20 illustrated in FIG. 2 through a through hole 140 at a portion, not illustrated.

The contact electrode 107 and the picture signal line 20 are formed on the same layer at the same time. An AlSi alloy, for example, is used for the contact electrode 107 and the picture signal line (in the following, they are represented by the contact electrode 107) in order to decrease the resistance. Since the AlSi alloy produces a hillock, or Al is diffused to other layers, such a structure is provided in which AlSi is sandwiched between a barrier layer formed of MoW, not illustrated, for example, and a cap layer.

An inorganic passivation film (an insulating film) 108 is coated over the contact electrode 107, and the TFT is protected entirely. The inorganic passivation film 108 is formed by CVD similarly to the first base film 101. An organic passivation film 109 is formed to cover the inorganic passivation film 108. The organic passivation film 109 is formed of a photosensitive acrylic resin. The organic passivation film 109 can also be formed of a silicone resin, epoxy resin, polyimide resin, and the like other than an acrylic resin. Since the organic passivation film 109 has a function of a planarization film, the organic passivation film 109 is formed thick. Although the film thickness of the organic passivation film 109 ranges from 1 to 4 μm, the film thickness is about 2 μm in many cases.

In order to provide continuity between a pixel electrode 110 and the contact electrode 107, the through hole 130 is formed on the inorganic passivation film 108 and the organic passivation film 109. A photosensitive resin is used for the organic passivation film 109. After a photosensitive resin is coated, the resin is exposed, and only portions to which light is applied are dissolved in a specific developer. In other words, the formation of a photoresist can be omitted by using a photosensitive resin. After the through hole 130 is formed on the organic passivation film 109, the organic passivation film is baked at a temperature of about 230° C., and then the organic passivation film 109 is completed.

After that, ITO (Indium Tin Oxide) to be the common electrode 110 is formed by sputtering, and ITO is patterned as ITO is removed from the through hole 130 and portions around the through hole 130. The common electrode 110 can be formed flat in the individual pixels. After that, SiN to be a second interlayer insulating film 111 is formed on the entire surface by CVD. After that, in the through hole 130, a through hole to provide continuity between the contact electrode 107 and the pixel electrode 112 is formed on the second interlayer insulating film 111 and the inorganic passivation film 108.

Figure 2:
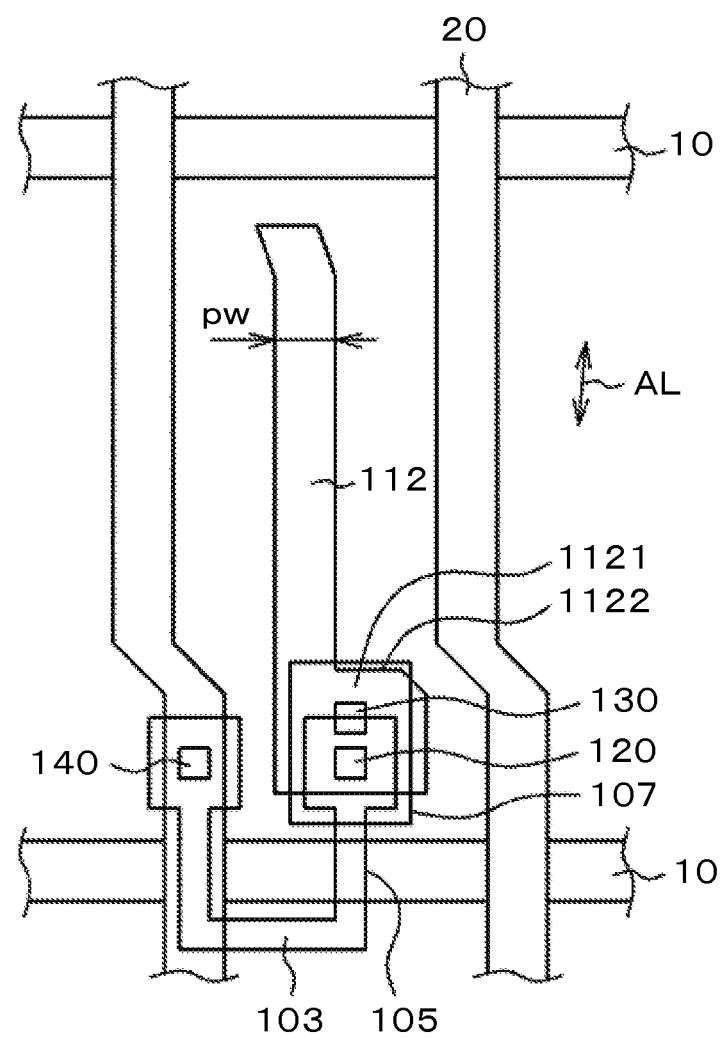
FIG. 2 is a perspective plan view of a pixel according to a first embodiment.

After that, ITO is formed by sputtering and patterned, and then the pixel electrode 112 is formed. In FIG. 2 and the subsequent diagrams, a planar form of the pixel electrode 112 according to an embodiment of the present invention is illustrated. An alignment film material is coated on the pixel electrode 112 by flexographic printing, ink jet printing, or the like, and baked, and an alignment film 113 is formed. For the alignment process for the alignment film 113, rubbing as well as optical alignment with polarized ultraviolet rays are used.

When a voltage is applied across the pixel electrode 112 and the common electrode 110, an electric flux line is produced as illustrated in FIG. 1. Liquid crystal molecules 301 are rotated with this electric field, the light quantity to be transmitted through a liquid crystal layer 300 is controlled for the individual pixels, and an image is formed.

In FIG. 1, a counter substrate 200 is disposed as the liquid crystal layer 300 is sandwiched between the counter substrate 200 and the TFT substrate 100. A color filter 201 is formed on the inner side of the counter substrate 200. For the color filter 201, red, green, and blue color filters are formed on the individual pixels, and images are formed by these color filters. A black matrix 202 is formed between the color filter 201 and the color filter 201 for improving the contrast of images. It is noted that the black matrix 202 also functions as the light shielding film of the TFT, and prevents a photocurrent from being carried through the TFT.

An overcoat film 203 is formed to cover the color filter 201 and the black matrix 202. Since the surfaces of the color filter 201 and the black matrix 202 are irregular, the surfaces are flattened with the overcoat film 203. An alignment film 113 is formed on the overcoat film for determining the initial orientation of liquid crystals. For the alignment process for the alignment film 113, rubbing or optical alignment is used similarly to the alignment film 113 on the TFT substrate 100 side.

It is noted that the configuration described above is an example, and for example, the inorganic passivation film 108 is not sometimes formed on the TFT substrate 100 depending on types. Moreover, the forming process of the through hole 130 is sometimes varied depending on types. In the following, the present invention will be described in detail using embodiments.

First Embodiment

FIG. 2 is a perspective plan view of a pixel portion according to a first embodiment of the present invention. A pixel electrode 112 is formed on a region surrounded by a scanning line 10 and a picture signal line 20. The pixel electrode 112 is an electrode in a one comb tooth shape. When the width of a pixel becomes small, it is not enabled to dispose a plurality of comb teeth in the pixel. A width pw of the pixel electrode 112 in a comb tooth shape ranges from 2 to 4 μm in FIG. 2.

In FIG. 2, a semiconductor layer 103 is formed between the picture signal line 20 and the pixel electrode 112. The semiconductor layer 103 is connected to the picture signal line 20 through a through hole 140, and connected to a contact electrode 107 through a through hole 120. The semiconductor layer 103 is extended in a U-shape between the through hole 120 and the through hole 140, and passed below the scanning line 10 twice. In FIG. 2, since the scanning line 10 functions as the gate electrode 105, a TFT is a double gate TFT. The positions of the electrodes or the interconnections in the direction of the cross section are as described in FIG. 1.

The long axis of the pixel electrode 112 is in the direction perpendicular to the scanning line 10, that is, the extending direction of the picture signal line 20. The rubbing direction of an alignment film 113 is tilted to the extending direction of the picture signal line 20 at a predetermined angle as illustrated in FIG. 2. The angle is in a range of angles of five to twenty degrees for defining the rotation direction of liquid crystals with an electric field. Since the rotation direction of liquid crystal molecules is unstable at the tip end of the pixel electrode 112 and a domain is produced, the tip end of the pixel electrode 112 is bent in order to prevent the production of a domain.

Figure 10:
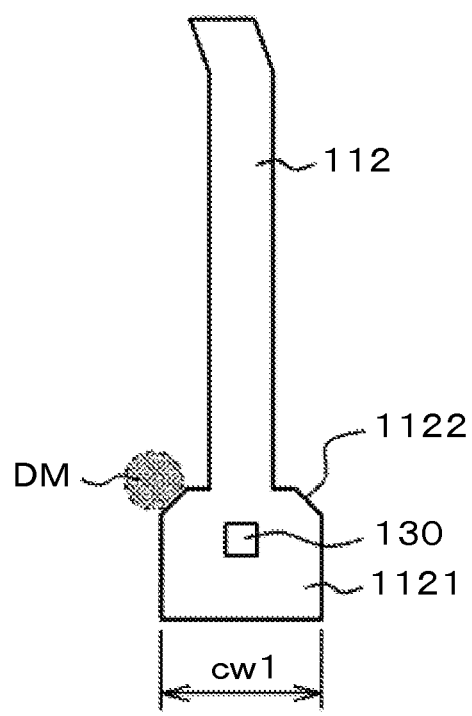
FIG. 10 is a plan view of a place where a domain is produced on the pixel according to the conventional example.
Figure 11:
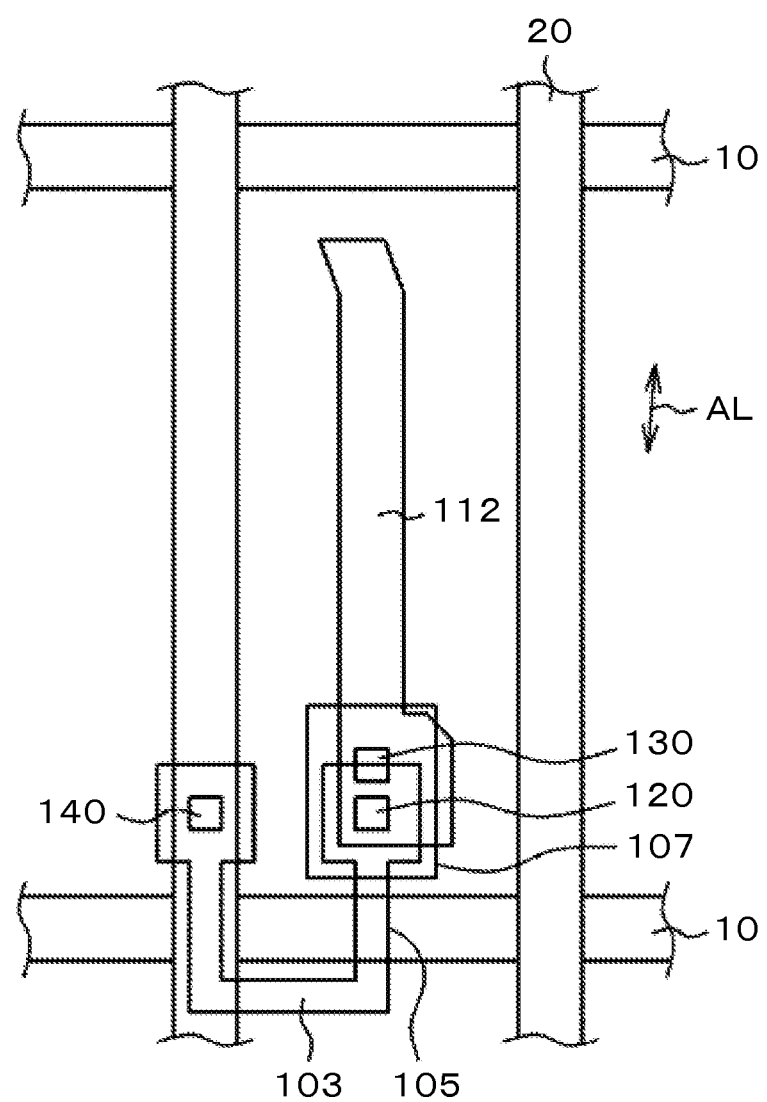
FIG. 11 is a perspective plan view of a pixel according to a first comparative example.
Figure 12:
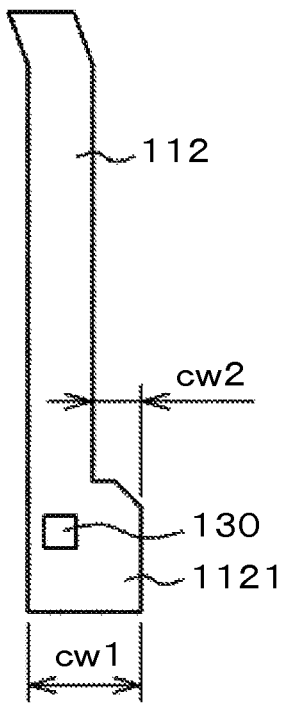
FIG. 12 is a plan view of a pixel electrode according to the first comparative example.
Figure 13:
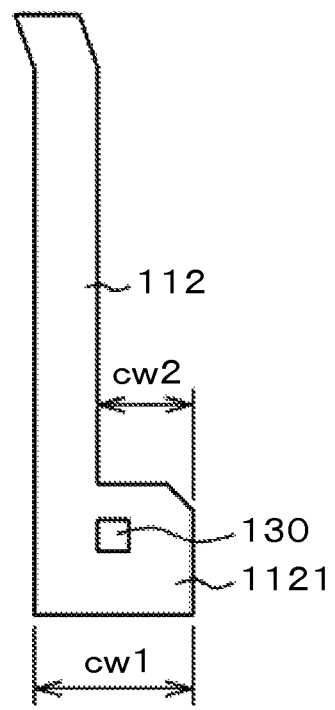
FIG. 13 is a plan view of a pixel electrode according to a second comparative example.

The pixel electrode 112 is connected to the contact electrode 107 through the through hole 130, and supplied with picture signals from the TFT. Since the through hole 130 is formed large, a contact portion 1121 of the pixel electrode 112 is formed to have a wide width for providing a sufficient connection region between the pixel electrode 112 and the contact electrode 107. However, when the contact portion 1121 of the pixel electrode 112 is extended on both sides of the pixel electrode 112 as illustrated in FIG. 10, a domain is produced on a left shoulder 1122 of the pixel electrode 112 because of the alignment direction of the alignment film 113.

In the pixel electrode 112 according to an embodiment of the present invention, since the shoulder 1122 of the pixel electrode 112, on which a domain is produced, is removed, no domain is produced on the shoulder. Instead, in order to provide the width cw1 of the contact portion 1121 sufficiently, a width cw2 of the shoulder on the other side is increased.

Figure 3:
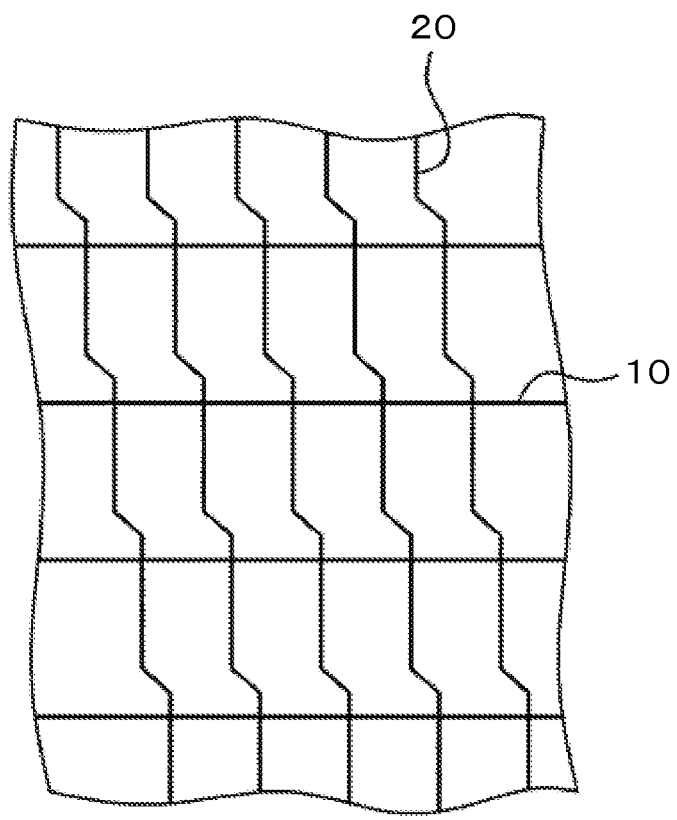
FIG. 3 is a schematic plan view of the arrangement of the pixels according to the first embodiment.
Figure 14:
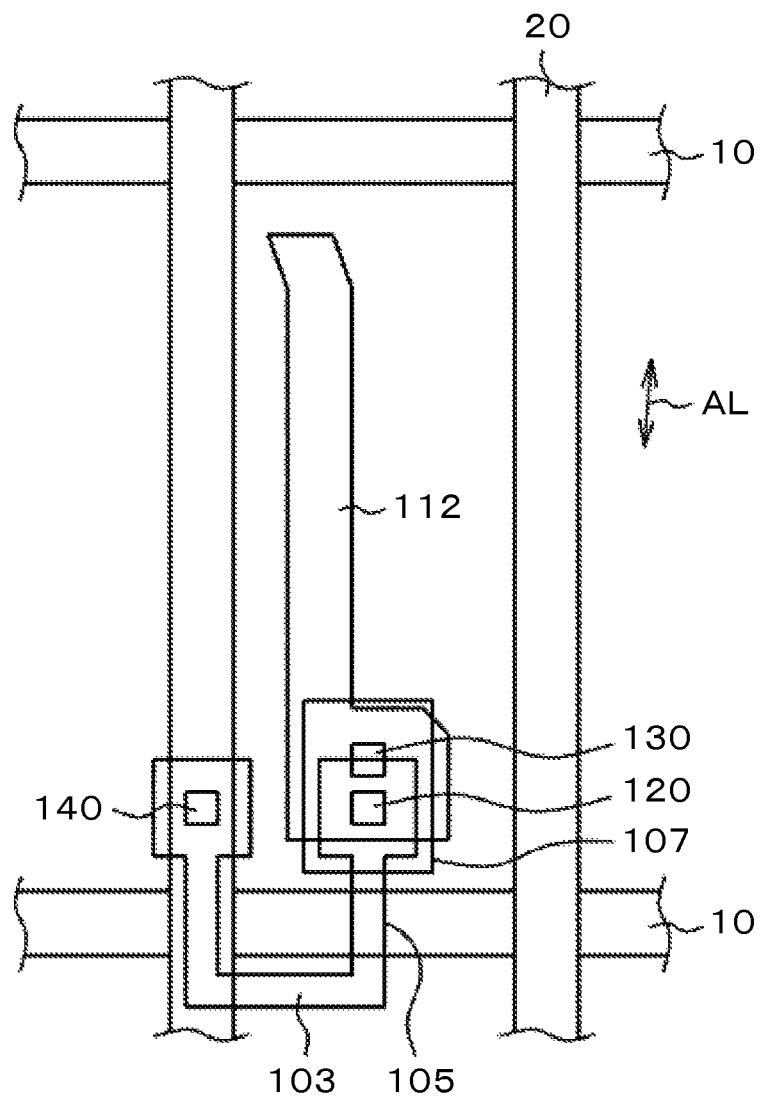
FIG. 14 is a perspective plan view of a pixel according to the second comparative example.

The feature of the present invention is in that the picture signal line 20 is bent on a portion corresponding to the contact portion 1121 of the pixel electrode 112, so that the comb tooth portion of the pixel electrode 112 can be disposed in the center between the picture signal line 20 and the picture signal line 20. With this configuration, the production of a domain can be prevented on the shoulder 1122 of the contact portion 1121 of the pixel electrode 112, and a problem of color mixture can be prevented, which is caused by the pixel electrode 112 unevenly disposed in the crosswise direction of the pixel as illustrated in FIG. 14. In the embodiment, since the picture signal line 20 is bent along the shape of the pixel electrode 112, the position of the pixel is moved gradually in the extending direction of the scanning line 10 every time when the picture signal line 20 crosses the scanning line 10 as illustrated in FIG. 3.

Figure 4:
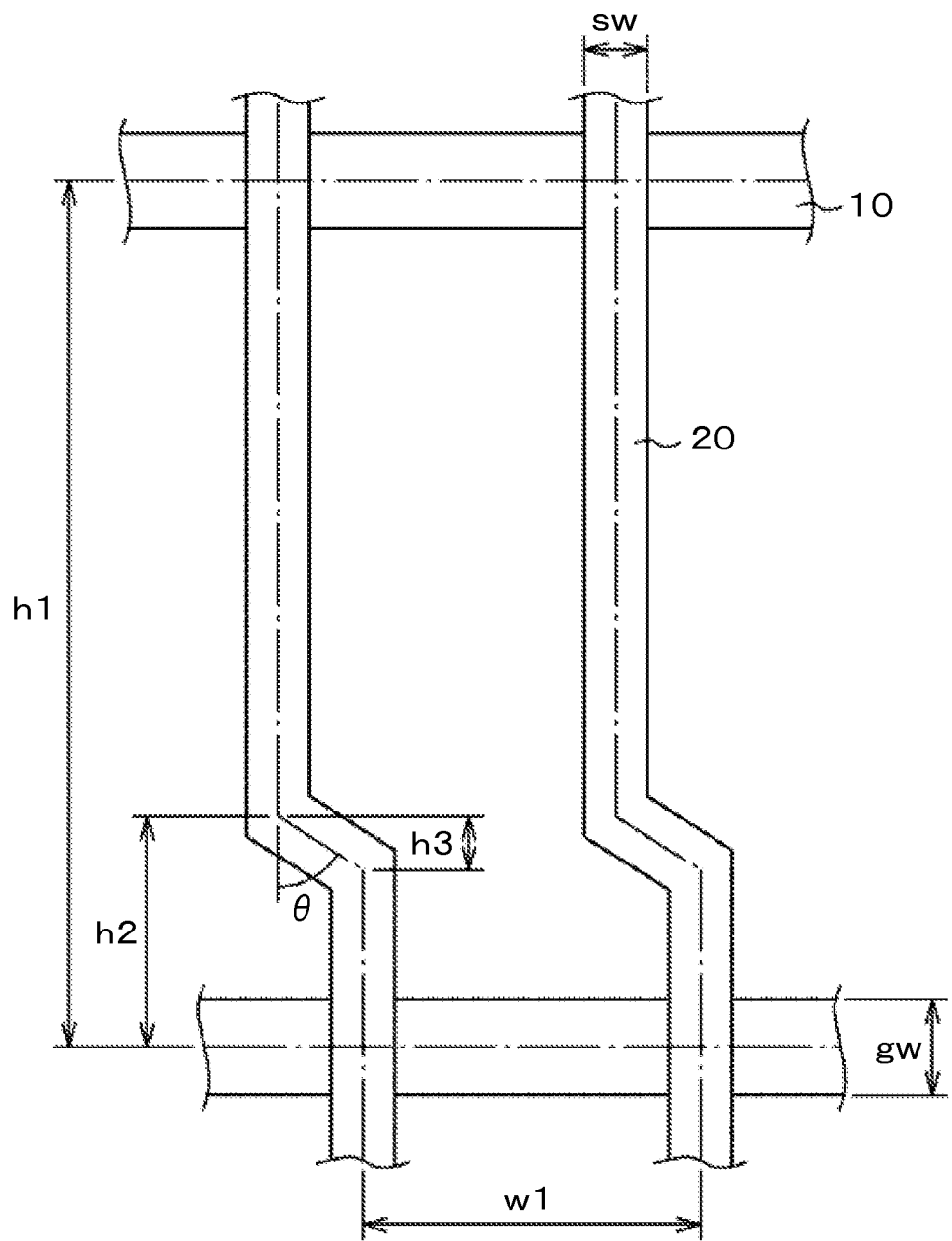
FIG. 4 is a plan view of the detailed shape of picture signal lines on the pixel.

FIG. 4 is a plan view of an exemplary shape of a pixel according to the embodiment. In FIG. 4, a width w1 of the pixel in the extending direction of the scanning line 10 is 15 μm, for example, and a width h1 in the direction perpendicular to the scanning line 10 is 45 μm, for example. The size of the pixel is defined by a distance between the centers of the picture signal lines 20 and a distance between the centers of the scanning lines 10. A width sw of the picture signal line ranges from 2 to 3 μm, and a width gw of the scanning line ranges from 2 to 4 μm.

In FIG. 4, a bent portion close to the center of the scanning line on the upper side is referred to as a first bent portion, and a bent portion close to the scanning line on the lower side is referred to as a second bent portion. In FIG. 4, a distance h2 from the center line of the scanning line 20 on the lower side to the first bent portion ranges from one-fifth to one-third of a distance h1 from the center line of the scanning line 20 on the upper side to the center line of the scanning line 20 on the lower side in the drawing. Moreover, a distance h3 between the first bent portion and the second bent portion in the direction vertical to the extending direction of the scanning line ranges from one-tenth to one-fifth of the distance h1 from the center line of the scanning line 20 on the upper side to the center line of the scanning line 20 on the lower side in the drawing. Furthermore, a bend angle θ of the bent portion ranges from angles of 30 to 90 degrees. These dimensions are determined in consideration of the length of the comb tooth electrode portion of the pixel electrode 112 and the length of the contact portion 1121 of the pixel electrode in the direction vertical to the scanning line.

The control region of liquid crystals on the pixel is mainly determined by the comb tooth electrode portion of the pixel electrode 112. Therefore, the bent shape of the picture signal line is to be determined as the shape is matched with the pixel electrode in such a manner that the transmittance of the pixel can be maximized.

Second Embodiment

Figure 5:
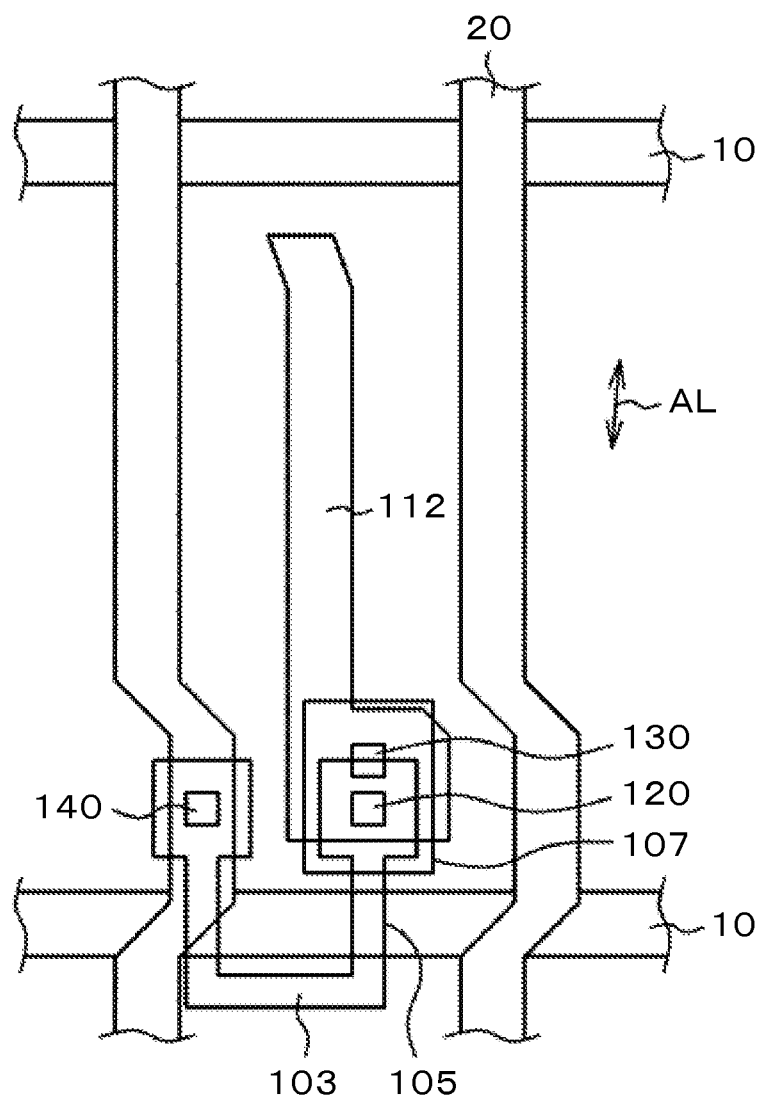
FIG. 5 is a perspective plan view of a pixel according to a second embodiment.

FIG. 5 is a perspective plan view of a pixel portion according to a second embodiment of the present invention. In FIG. 5, the shape, the size, and the like of a pixel electrode 112 are the same as in FIG. 2. The second embodiment is different from the first embodiment in that a picture signal line 20 is bent in the extending direction of a scanning line 10 and then bent in the opposite direction on the lower part of a pixel.

Figure 6:
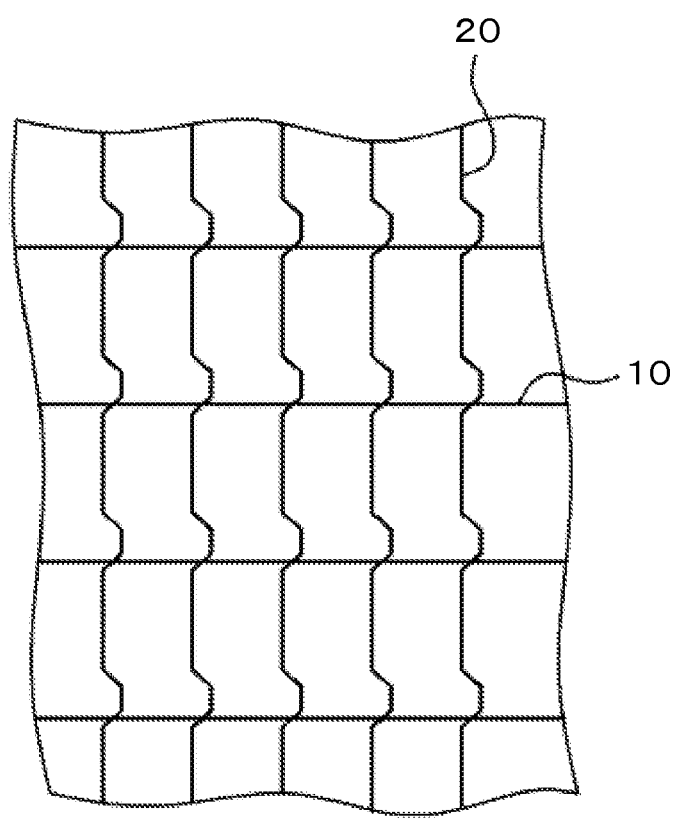
FIG. 6 is a schematic plan view of the arrangement of the pixels according to the second embodiment.

With this configuration, it is eliminated that pixels are moved in the extending direction of the scanning line every time when pixels in the same color cross the scanning line as illustrated in FIG. 3. FIG. 6 is the arrangement of pixels according to the embodiment. In the embodiment, as illustrated in FIG. 6, pixels in the same color are arranged almost linearly in the direction vertical to the extending direction of the scanning line.

Since the other configurations are the same as the first embodiment, the production of a domain can be suppressed, the margin of the connection between the contact electrode and the pixel electrode on a second through hole 130 can be secured, and the pixel electrode can be disposed in the center of the pixel, similarly to the first embodiment.

Third Embodiment

Figure 7:
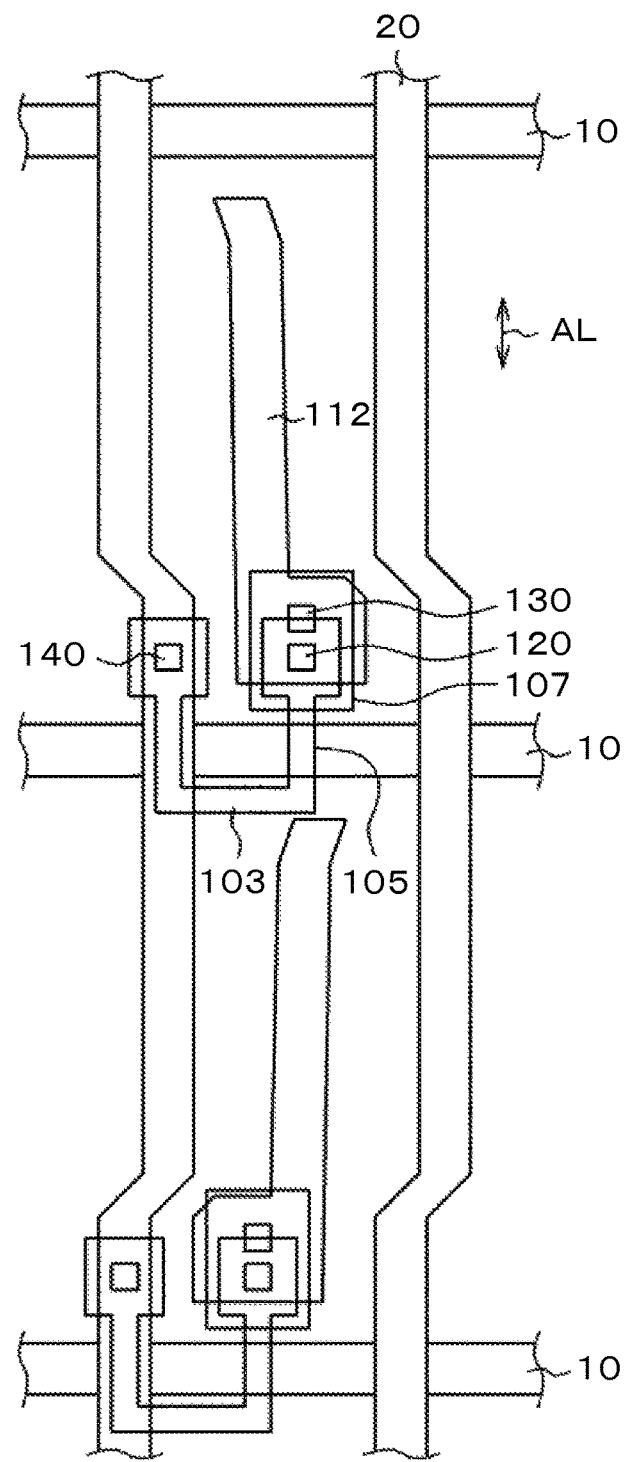
FIG. 7 is a perspective plan view of a pixel according to a third embodiment.

FIG. 7 is a perspective plan view of a third embodiment. The third embodiment is different from the first embodiment in that two pixels adjacent in the direction vertical to the extending direction of a scanning line 10 are paired. In FIG. 7, the alignment direction AL of an alignment film 113 is the direction vertical to the extending direction of the scanning line 10. The long axis of a pixel electrode 112 of the pixel on the upper side in FIG. 7 is tilted in the left direction, and a pixel electrode 112 of the pixel on the lower side is tilted in the right direction. Both of the slope of the pixel electrode 112 on the upper side and the slope of the pixel electrode 112 on the lower side are at angles of five to twenty degrees in the direction perpendicular to the extending direction of the scanning line 10. In FIG. 7, since the direction of the slope of the long axis of the pixel electrode 112 is opposite to the alignment direction AL between the pixel on the upper side and the pixel on the lower side, the rotation direction of liquid crystal molecules 301 is different in the case where a voltage is applied to the pixel electrode 112. However, the effect is the same. Thus, the viewing angle characteristics can be made uniform.

On the pixel on the upper side in FIG. 7, the left shoulder of the pixel electrode on which a domain is easily produced is removed because of the relationship between the alignment direction AL and the direction of the slope of the long axis of the pixel electrode 112. On the pixel on the lower side, the shoulder on the right side of the pixel electrode on which a domain is easily produced is removed because of the relationship between the alignment direction AL and the direction of the slope of the long axis of the pixel electrode 112. Therefore, also on the upper side of the pixel electrode and on the pixel on the lower side, the production of a domain is suppressed.

Moreover, the long axis of the comb tooth portion of the pixel electrode 112 is positioned in almost the middle of the picture signal line 20 and the picture signal line 20. Therefore, it is possible to suppress a problem of color mixture between pixels adjacent in the extending direction of the scanning line 10 as described in FIG. 14. Furthermore, also in the embodiment, a contact portion 1121 of the pixel electrode 112 can be provided widely, so that the reliability of the connection between a contact electrode 107 and the pixel electrode 112 on a second through hole 130 can also be secured.

Figure 8:
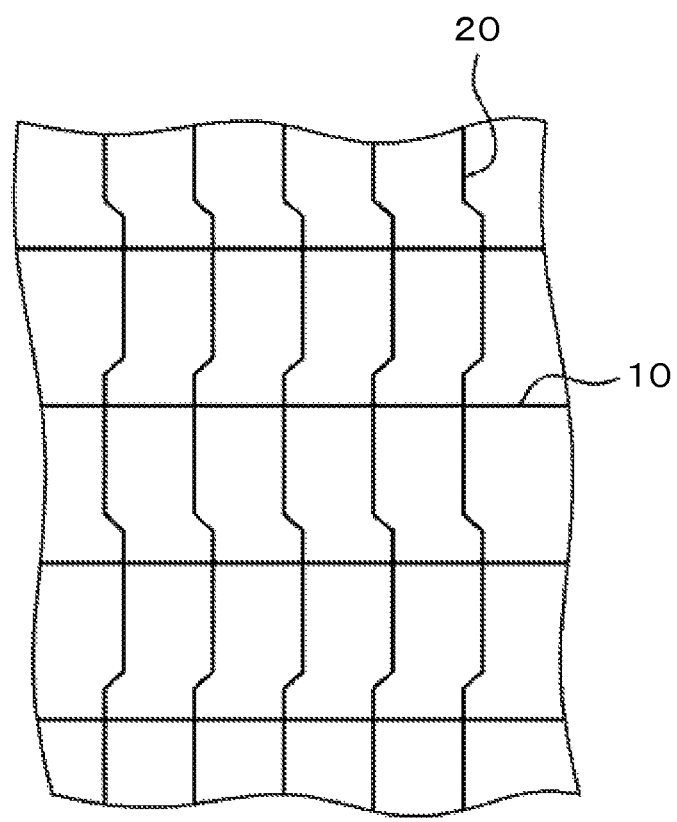
FIG. 8 is a schematic plan view of the arrangement of the pixels according to the third embodiment.
Figure 9:
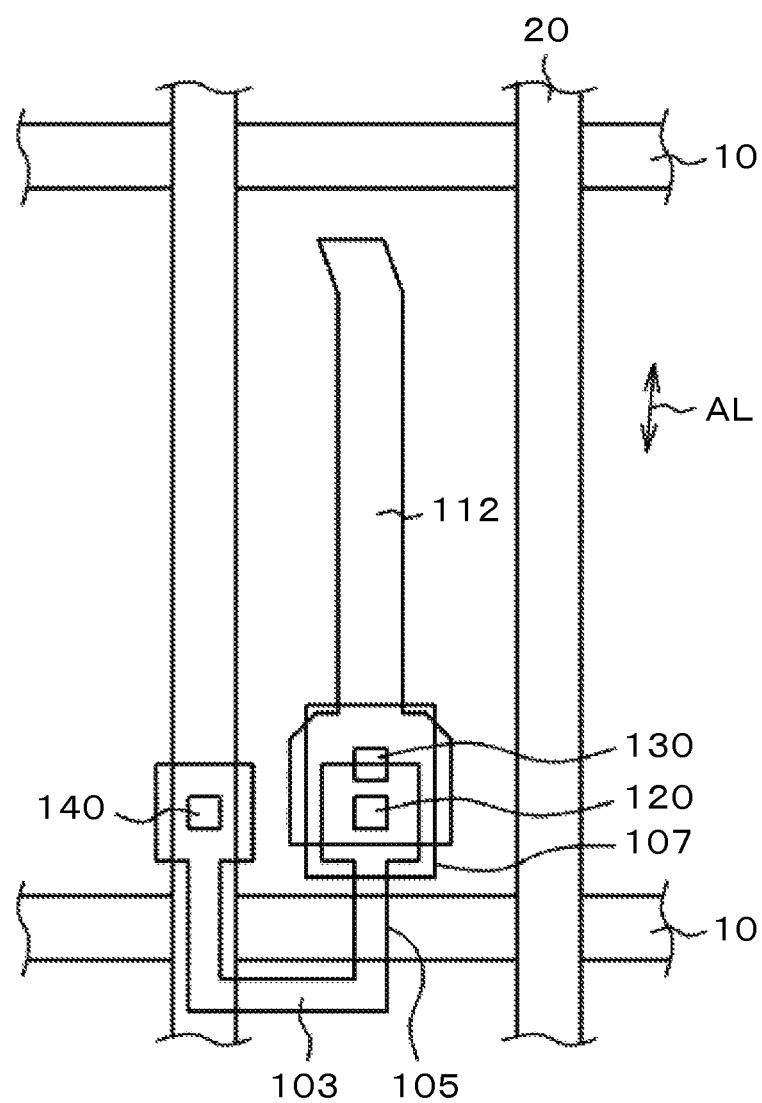
FIG. 9 is a perspective plan view of a pixel according to a conventional example.

In the embodiment, the direction in which the width of the contact portion 1121 of the pixel electrode 112 is widened can be divided to the left and the right between the pixel on the upper side and the pixel on the left side. Therefore, the bending direction of the picture signal line 10 can be reversed between the pixel on the upper side and the pixel on the lower side, so that pixels in the same color can be arranged in the direction almost vertical to the extending direction of the scanning line 10 as illustrated in FIG. 8. In other words, in FIG. 8, the bending direction of the picture signal line 20 is reversed every time when the picture signal line 20 crosses the scanning line 10.

In the embodiment, the rotation direction of liquid crystals is reversed between the pixel on the upper side and the pixel on the lower side, so that the viewing angle characteristics can be made more uniform. This pixel arrangement is called a pseudo dual domain mode. The present invention is also applicable to the pixel arrangement of this pseudo dual domain mode like.

What is claimed, is:

1. A liquid crystal display device comprising:
a first scanning line and a second scanning line extending in a first direction, and arranged in a second direction with a first interval;
a first picture signal line and a second picture signal line extending in the second direction, and arranged in the first direction with a second interval; and
a pixel electrode is formed in a region surrounded by a center line of the first scanning line, a center line of the second scanning line, a center line of the first picture signal line, and a center line of the second picture signal line, wherein
the pixel electrode is formed on an interlayer insulating film that is formed on a planar common electrode,
the pixel electrode includes a comb tooth portion and a contact portion,
the first picture signal line extends straight in the second direction along the comb tooth portion, and bends at a first bend point toward the contact portion, and further bends at a second bend point in the second direction between the first scanning line and the second scanning line, and
the second picture signal line extends straight in the second direction along the comb tooth portion, and bends at a third bend point away from the contact portion and further bends at a fourth bend point in the second direction between the first scanning line and the second scanning line.

2. The liquid crystal display device according to claim 1, wherein when a distance between the center line of the first scanning line and the center line of the second scanning line in the second direction is defined as h1 and a distance between the center line of the second scanning line and the first bent point in the second direction is defined as h2, a relation $1/5 \leq h2/h1 \leq 1/3$ is provided.

3. The liquid crystal display device according to claim 1, wherein when a distance between the center line of the first scanning line and the center line of the second scanning line in the second direction is defined as h1 and a distance between the first bent point and the second bent point in the second direction is defined as h3, a relation $1/10 \leq h3/h1 \leq 1/5$ is provided.

4. The liquid crystal display device according to claim 1, wherein an angle formed between a bending direction of the first picture signal line and the second direction at the first bend point is 30 to 90 degrees.

5. The liquid crystal display device according to claim 1, the liquid crystal display device further comprising a third scanning line extending in the first direction, and arranged in the second direction with the first interval from the second scanning line,
wherein the first picture signal line has a fifth bend point bending in an opposite direction to the first direction, and a sixth bend point bending in the second direction, and wherein the second picture signal line has a seventh bend point bending in an opposite direction to the first direction, and an eighth bend point bending in the second direction.

6. A liquid crystal display device comprising:
a first scanning line, a second scanning line, and a third scanning line extending in a first direction, and arranged in a second direction with a first interval;
a first picture signal line and a second picture signal line extending in the second direction, and arranged in the first direction with a second interval;
a first pixel electrode is formed in a region surrounded by a center line of the first scanning line, a center line of the second scanning line, a center line of the first picture signal line, and a center line of the second picture signal line; and
a second pixel electrode is formed in a region surrounded by the center line of the second scanning line, a center line of the third scanning line, the center line of the first picture signal line, and the center line of the second picture signal line, wherein
the first pixel electrode and the second pixel electrode are formed on an interlayer insulating film that is formed on a planar common electrode,
the first pixel electrode includes a first comb tooth portion and a first contact portion,
the first picture signal line extends straight in the second direction approximately along the first comb tooth portion, and bends at a first bend point toward the first contact portion, and further bends at a second bend point in the second direction between the first scanning line and the second scanning line,
the second picture signal line extends straight in the second direction approximately along the first comb tooth portion, and bends at a third bend point away from the first contact portion, and further bends at a fourth bend point in the second direction between the first scanning line and the second scanning line,
the second pixel electrode includes a second comb tooth portion in the first direction is larger than a width of the second comb tooth portion in the first direction, a second contact portion extending in a opposite direction to the first direction,
the first picture signal line extends straight in the second direction approximately along the second comb tooth portion, and bends at a fifth bend point away from the second contact portion, and further bends at a sixth bend point in the second direction between the second scanning line and the third scanning line, and
the second picture signal line extends straight in the second direction approximately along the second comb tooth portion, and bends at a seventh bend point toward the second contact portion, and further bends at an eighth bend point in the second direction between the second scanning line and the third scanning line.

* * * * *